United States Patent [19]
Seymour

[11] Patent Number: 5,488,559
[45] Date of Patent: Jan. 30, 1996

[54] MAP-MATCHING WITH COMPETING SENSORY POSITIONS

[75] Inventor: Leslie G. Seymour, Barrington, Ill.

[73] Assignee: Motorola, Inc., Schaumburg, Ill.

[21] Appl. No.: 100,804

[22] Filed: Aug. 2, 1993

[51] Int. Cl.⁶ ................................................. G06F 15/20
[52] U.S. Cl. .......................... 364/449; 342/457; 342/357; 364/450
[58] Field of Search ................................. 364/449, 450, 364/444, 460, 457, 447; 342/357, 457; 340/990, 995

[56] References Cited

U.S. PATENT DOCUMENTS

| | | | |
|---|---|---|---|
| 4,796,191 | 1/1989 | Honey et al. | 364/450 |
| 4,964,052 | 10/1990 | Ohe | 364/449 |
| 4,989,151 | 1/1991 | Nuimura | 364/449 |
| 5,119,301 | 6/1992 | Shimizu et al. | 364/450 |
| 5,243,529 | 9/1993 | Kashiwazaki | 364/449 |
| 5,293,318 | 3/1994 | Fukushima | 364/449 |
| 5,311,195 | 5/1994 | Mathis et al. | 342/357 |
| 5,323,152 | 6/1994 | Morita | 340/988 |
| 5,334,986 | 8/1994 | Fernhout | 342/357 |
| 5,394,333 | 2/1995 | Kao | 354/450 |

*Primary Examiner*—Michael Zanelli
*Attorney, Agent, or Firm*—Nicholas C. Hopman

[57] ABSTRACT

A method, and corresponding system, of map-matching uses a first trend of position vectors (207, 215, 221, 229, 235, and 245) provided by a first position sensory system, and a second trend of position vectors (203, 211, 217, 225, and 231) provided by a redundant position sensory system. These sensory systems are preferably mounted on a vehicle but also may be a part of a hand held guidance device. The first position sensory system is preferably a GPS receiver (305) based system, and the second position sensory system is preferably a dead-reckoning sensory system, based on a compass (307) and an odometer (309). The first trend of position vectors (207, 215, 221, 229, 235, and 245) and the second trend of position vectors (203, 211, 217, 225, and 231) are compared to a trend of position vectors (212, 287, 289, 291, and 293) based on a map reference (303). A reference position vector (205, 213, 219, 227, 233, 239, 243, 246, and 249) is updated based on a matching of either or both of the first and second trends of position vectors to the trend of road segment position vectors based on the map reference. Further, one or more of the non-matching sensory system(s), or an estimated position vector associated with the non-matching sensory system(s), may be corrected influenced based on the updated reference position vector.

25 Claims, 4 Drawing Sheets

PRIOR ART

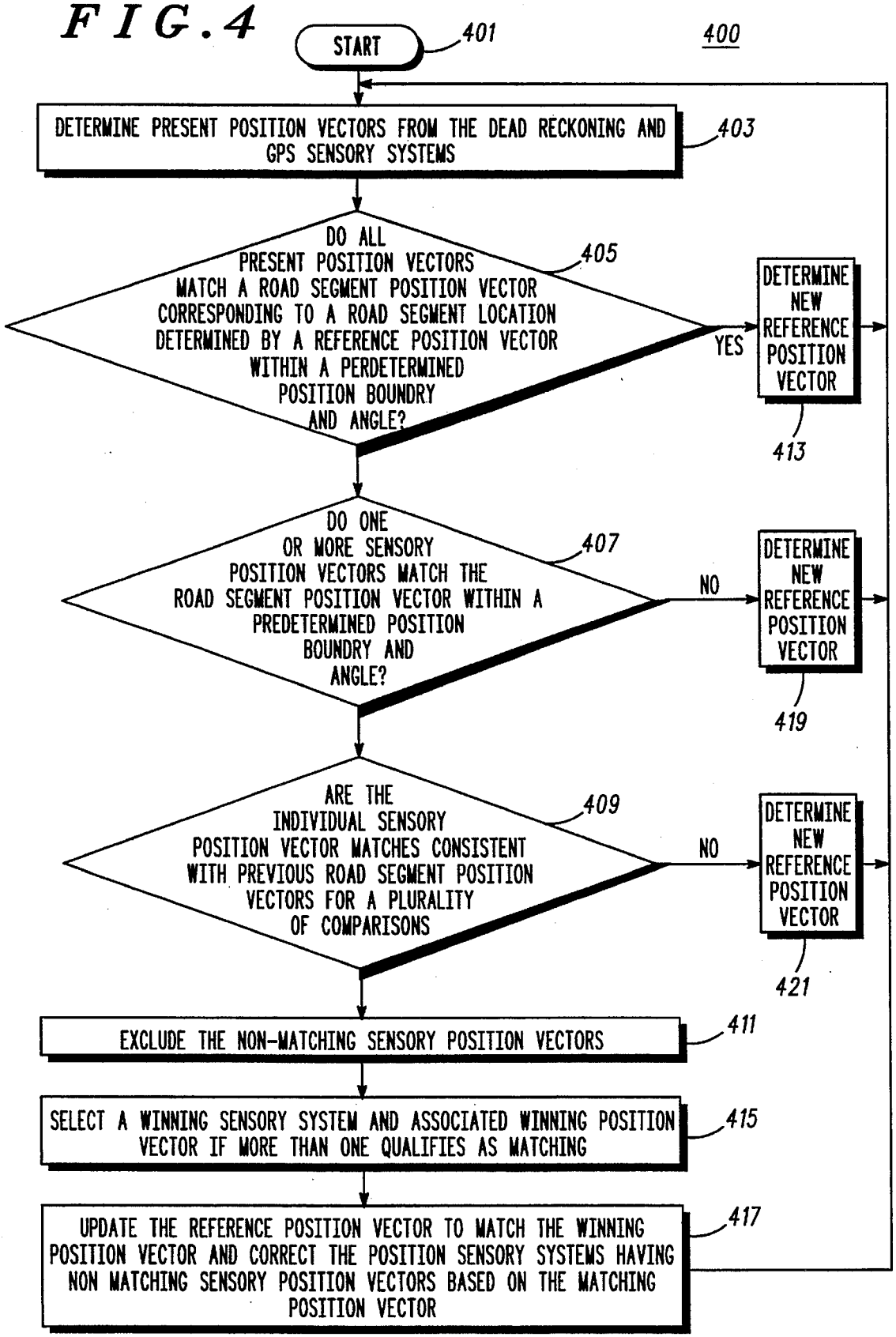

MAP-MATCHING WITH COMPETING SENSORY POSITIONS

FIELD OF THE INVENTION

This invention is generally directed to the field of navigation, and particularly to the use of map-matching to develop the most accurate estimate of present position and heading and to influence other position sensory systems based on the estimate of present position.

Background of the Invention

A class of contemporary navigation known as guidance systems often have capability for guiding a traveler along a route between the traveler's present position and a selected destination position. Often, as the traveler, or a driver with his vehicle, traverses along a road, the guidance system will assist the driver by either displaying a map in a graphical form, or by displaying guidance instructions to the driver at the appropriate present position. For instance when a driver's vehicle approaches within a position of 200 meters of an intersection, the guidance system may announce, or display an instruction to turn right in 200 meters.

These contemporary route guidance systems typically rely on various redundant position sensory systems to estimate the present position of the traveler or vehicle. Using redundant sensory systems enables the guidance system to reduce an impact of various known errors associated with these position sensory systems. Position sensory systems may include dead-reckoning sensors, a GPS (Global Positioning System) receiver, a gyroscope sensor, or other types of sensors. As mentioned above, each of these position sensory systems has at least a known accuracy, or more important, inaccuracies. Because of this inaccuracy, the associated route guidance system may provide untimely information to the traveler because the guidance system is presented with an inaccurate estimate of the traveler's present position. A review of some of these inaccuracies includes the following.

A dead-reckoning position sensory system is typically based on a differential odometer that measures both incremental positions and headings. Both of these changes are measured from a presumed starting position. A differential odometer is typically constructed with a pair of pulse counting sensors each of which are mounted on laterally opposite sides of a vehicle's non-powered wheels. As the vehicle moves and the wheels rotate, pulses are generated in which the incremental number indicating distance traversed. The difference between the amount of pulses generated from each of the pair of sensors is indicative of the change in heading. While navigating by dead-reckoning, the vehicle will develop a position uncertainty that increases during operation due to various error sources inherent in the behavior of an incremental positioning system. In the case of the differential odometer, as the vehicle traverses, an unknown variation in tire circumference will likely yield a difference in the pulse rate output from the pair of sensors. In addition to creating erroneous distance traversed information, this difference will be interpreted as a change in heading that may manifest itself in a sensed circular pattern. This falsely indicates to an observer that the vehicle is turning when it isn't. The position inaccuracies contributable to this circular behavior can be significant. Experience shows cases of differences in position caused by cumulative heading errors of 200 meters per kilometer. Some dead-reckoning systems rely also on a compass for providing heading information. Compasses may exhibit temporary errors attributable to magnetic blunders. These magnetic blunders can be caused when a vehicle traverses over a bridge with a magnetic influence. When this happens, it appears that the vehicle is turning when it is not. Position inaccuracies characteristic of GPS receiver systems include: inaccuracy resulting from satellite ephemera, inaccurate modeling of the atmospheric effects, and partial availability of satellites.

Because of these position inaccuracies, these position sensory systems often rely on adjusting or correcting the estimated present position of the traveler based on a fixed, or known, position reference. Often this reference is a map. Typically maps are provided in the form of a digital map database. Although these digital maps also have position errors, based on partial availability and precision of position coordinates, these position errors are fixed and determinable. Position errors notwithstanding, the traveler uses the roads associated with the map, so it is considered a suitable position reference by which the position estimate of the traveler's present position can be adjusted. This adjustment of other position sensory systems' sensors using a map reference, is typically referred to as map-matching.

A problem with conventional map-matching methods is that they are very computationally resource intensive, and can sometimes provide an inaccurate map-match. These contemporary map-matching methods are typically based on stochastic sensor fusion. This approach relies on iterating correlation matrices that combine positions from the various position sensory systems to create a fused position estimate. Eliminating the impact of erroneous individual sensory system estimates is not always successful with this conventional approach. Often, these erroneous position estimates are temporarily blended, or fused, with accurate sensory system estimates, and the fused position estimate thereby becomes inaccurate. Because this map-matching process can generate an inaccurate position estimate it can appear that the position estimate is on the wrong road and the route guidance system may get lost and/or present incorrect information to the traveler.

What is needed is an improved map-matching solution that ensures the most accurate estimate of the present position of the traveler based on all of the position information available. A preferred solution will not be a computationally intensive and will be more accurate than conventional methods.

BRIEF DESCRIPTION OF THE DRAWINGS

FIG. 4 is a software flow chart illustrating method steps in accordance with the present invention.

DETAILED DESCRIPTION OF THE PREFERRED EMBODIMENTS

An improved method, and corresponding system, of map-matching uses a first trend of position vectors provided by a first position sensory system, and a second, or redundant trend of position vectors provided by a redundant position sensory system. Note that the term vector in this application refers to a position and a heading. The first trend of position vectors and the second trend of position vectors are compared to a trend of road segment position vectors based on a map reference. A reference position vector is updated based on a trended correlation, of either of the first and second trends of position vectors to the trend of road segment position vectors based on the map reference. The reference position vector is iteratively determined and may be updated influenced by either of the sensory systems depending on their respective behaviors. Also, one or more of the sensory systems, or an estimated position vector associated with the sensory systems, may be corrected influenced based on the updated reference position vector.

Figure 1:
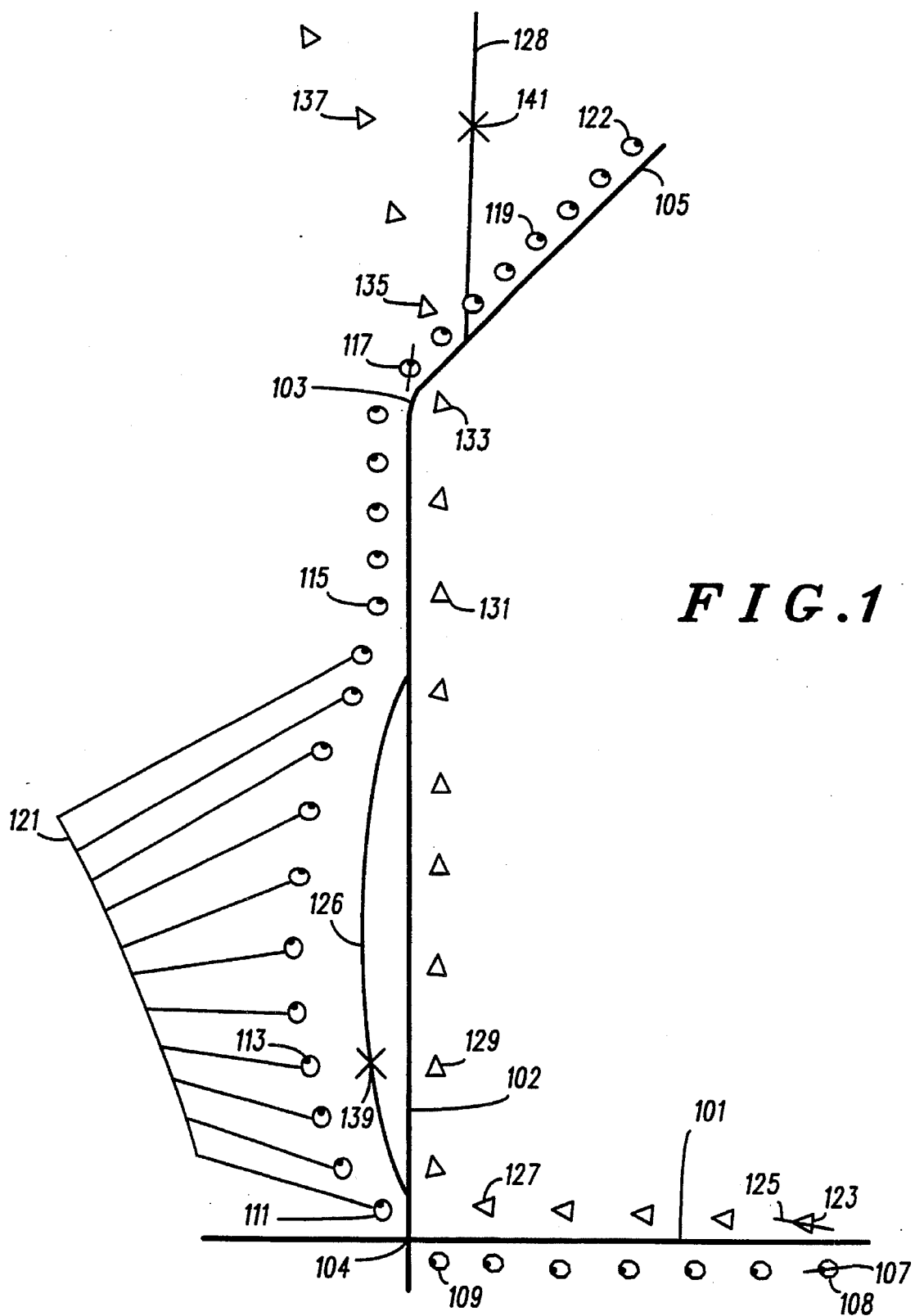
FIG. 1 is a diagram showing a graphical representation of various road segments from a map database and position estimates over time from various position sensory systems.

FIG. 1 is a diagram showing a graphical representation of a road extracted from a map reference. A first road starts at reference number 101. This road 101 intersects a main road 102 at an intersection 104. The main road 102 continues through a turn at reference number 103 and continues to reference number 105 at a heading different from the heading of the main road at reference number 102. Ancillary roads include a service road 126, that closely parallels the main road, and an exit road 128, that juts off the main road between reference numbers 103 and 105.

A series of circular icons starting at reference number 107 represents the position and heading output of a dead-reckoning sensory system associated with a traversing vehicle. Note that reference number 107 shows a heading orientation associated with the sensory position 108. In combination, the position 108 and the heading 107 form a position vector. A series of circular icons 108, 109, 111, 113, 115, 117, 119, and 122 represent a portion of the position vectors provided by a dead-reckoning sensory system associated with the traversing vehicle. Note here that the dead-reckoning system employed here includes an odometer and a compass. Essentially, the circular icons 108–122 follow the first road as it commences at reference number 101, continue through the intersection 104 briefly into the main road 102, diverge left beyond the service road, return onto the main road 102, and continue past the turn 103 and the reference number 105.

A progressive series of triangular icons 123, 127, 129, 131, 133, 135, and 137 illustrate a portion of another set of position vectors. These position vectors are provided by a GPS (Global Positioning System) associated with the same traversing vehicle. This position information 123–137, suggests that the vehicle is commencing on the first road 101, continuing past the intersection 104 onto the main road 102, and diverging off all roads at reference number 135, proximate turn 103.

Observations of this data include that the vehicle position commences proximate the positions 108 and 123. Shortly after the turn at intersection 104 the position of the vehicle is ambiguous. The only thing that is certain is that the vehicle is not positioned at two places, and that the vehicle is not traversing on two roads. The dead-reckoning positioning system indicates that the vehicle is positioned somewhere beyond the service road 126 but not specifically on any mapped road, and the GPS positioning system indicates that the vehicle is positioned on the main road 102. A conventional map-matching method would blend the position vectors 113 and 129. This would result in a blended position vector 139. Blended position vector 139 would be considered the position of the traversing vehicle. When a map-match is made, the blended position vector would be snapped to the service road 126. In the case described here this would be in error because the vehicle is actually traversing on the main road 102 and a magnetic blunder in the dead-reckoning positioning system has caused the blended position vector 139 to appear on the service road 126. As mentioned in the Background section, this magnetic blunder can be caused when a vehicle traverses over a bridge with a magnetic influence. When this happens, it appears that the vehicle is turning and not positioned temporarily on any road, such as the main road 102 or the service road 126, when it may actually be positioned on one of these roads. Because this dead-reckoning system is reliant on a magnetic compass, this explains why the dead-reckoning position appears beyond the service road 126. Further, after blending the dead-reckoning position with the GPS position, the vehicle appears to be on the service road 126, when it is actually on the main road 102.

As the vehicle continues to traverse, the position vectors converge back onto the main road 102 at positions indicated by reference numbers 115 and 131. The dead-reckoning position vectors continue on the main road, conforming to the turn 103 and follow on to reference number 105. However, as successive position vectors are provided from the GPS positioning system, the positions diverge from the main road at the turn 103, as shown by reference number 135. The positions provided from the GPS positioning system continue to diverge at reference number 137. After the turn 103, the position of the vehicle, with respect to the position vectors provided by the GPS positioning system, is ambiguous. What is unknown, by considering only the GPS positioning system position vectors, is which road, either the exit road 128 or the main road 105, the vehicle is actually traversing on.

Further, if a conventional map-matching method was applied, the method would blend the position vectors 137 and 122. This would result in a blended position vector 141. Blended position vector 141 would be considered the position of the traversing vehicle. This would make the vehicle appear to be positioned on the exit road 128, when it is actually positioned on the main road 105.

The behavior of the GPS positioning system is the result of a typical GPS positioning system problem referred to as a fadeout condition. This is another example of a known inaccuracy associated with a position sensory system. Because GPS positioning systems are susceptible to this fadeout condition, this explains why the GPS position vectors appear to diverge from the main road at rum 103, and why the blended dead-reckoning and GPS position vectors appear on the exit road 128.

Next, another map and associated series of sensory position vectors will be examined to illustrate how the improved method, and associated system, will cope with these known position sensory system inaccuracies.

Figure 2:
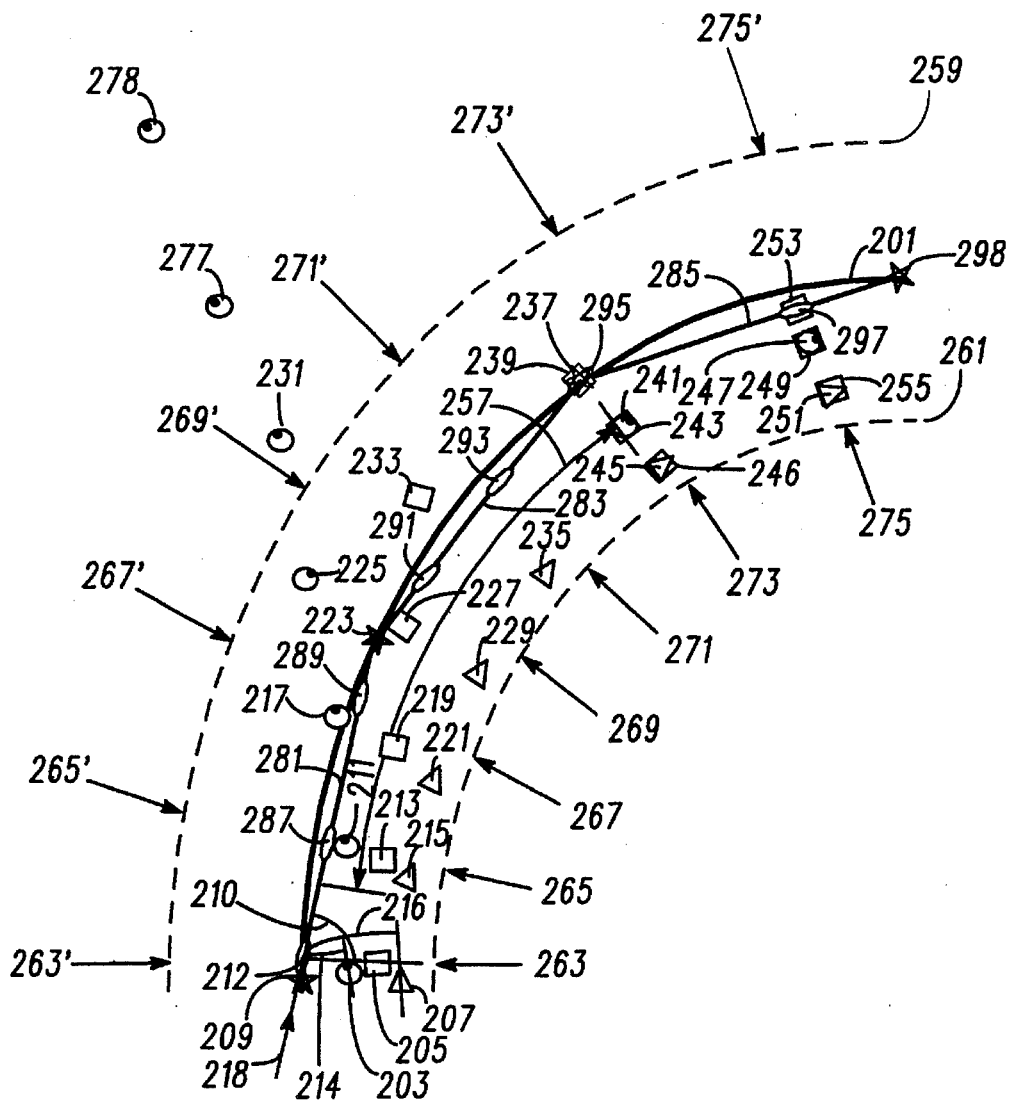
FIG. 2 is another diagram showing a graphical representation of various road segments from a map database and position estimates over time from various position sensory systems.

FIG. 2 is a diagram showing a graphical representation of a road 201. A series of circular icons including 203, 211, 217, 225, 231, 241, 247, and 277 represent successive position vectors provided by a dead-reckoning position sensory system described below. Note that the trend of the successive dead-reckoning position vectors diverges from the actual road, indicating either an error or an off road condition between reference numbers 203, 211, 217, 225, 231, and 277. Also note that at reference numbers 241 and 247 the dead-reckoning position vectors appear to be back on track with the road 201. This is due to the improved method's adjustment of the dead-reckoning position system.

A series of triangular icons including 207, 215, 221, 229, 235, 245, and 251 represent successive position vectors provided by a GPS based position sensory system described later. Both the dead-reckoning positioning system and the GPS positioning system are associated with a vehicle that is traversing along the road 201.

A series of star icons including 209, 223, 237, and 298 represent successive road segment endpoint locations associated with various road segments represented on a map reference described below. Because the map reference is digitized, it represents the road 201 as a series of road segments 281, 283, and 285 delimited by the road segment endpoint locations demarked by the star icons 209, 223, 237, and 298.

A series of rectangular icons including 205, 213, 219, 227, 233, 239, 243, 246, 249, 253, and 255 represent various reference position vectors determined dependent on the improved method. Note that initially the reference position vector may be derived dependent on either or all of the positional sensory information, and later is iteratively determined and may be updated influenced by either of the positional sensory systems depending on their respective behaviors.

A series of oval icons including 212, 287, 289, 291, 293, 295, and 297 represent successive road segment position vectors associated with a projection of the just-mentioned reference position vectors onto the above-mentioned series of road segments 281, 283, and 285.

The dashed lines 259 and 261 bounding the road 201, represent a reference position boundary used as one means to determine the position sensory systems' performance. In the example represented in FIG. 2, these reference position boundaries, 259 and 261, are positioned 25 meters apart from the road 201. Of course other distance criteria may be used depending on the frequency of the map-matching, sensor parameters, other map matching techniques, and road configurations. Reference numbers 263, 265, 267, 269, 271, 273, 275 and corresponding reference numbers 263', 265', 267', 269', 271', 273', 275' represent synchronization reference positions where the improved method is iterated. The performance of the improved method may depend on the frequency of these synchronization reference positions.

Figure 3:
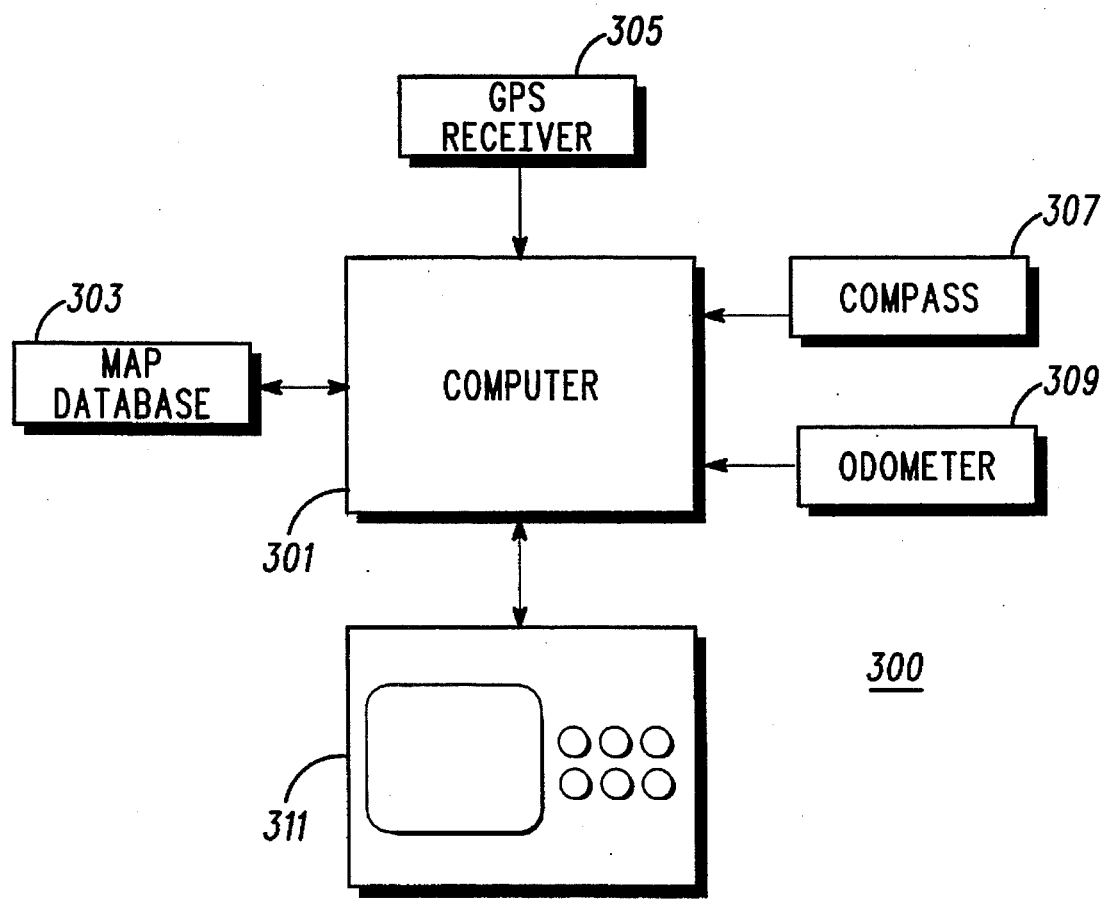
FIG. 3 is a system block diagram illustrating a hardware platform for executing software representing the method steps described in a preferred embodiment.

A hardware platform will be described before detailing the improved method. FIG. 3 includes a computer 301 for executing method steps described later. Preferably, this computer is based around a microcontroller such as Motorola's 68332. In support of the microcontroller, the computer 301 includes program memory in the form of EPROM (Erasable Programmable Read Only Memory), variable memory in the form of RAM (Random Access Memory), and suitable interface circuitry to transform the various input sensory signals into information usable by the microcontroller. This type of computer 301 is easily constructed by those skilled in the art. Those skilled in the art will also recognize many alternatives to this computer 301 platform that will perform a substantially equivalent service.

Surrounding the computer 301, is a map database apparatus 303, which is in the form of a removable media disk drive such as a CD-ROM (Compact Disk-Read Only Memory) drive. The map database apparatus 303 has an optical disk containing a road map on it. The road map represented in FIG. 2 is a component part of this road map. Of course, other media may be used to store and recall map reference information. A display-keypad 311 provides a user interface for communicating the guidance and/or other navigation information to the traveler.

A GPS receiver 305 provides position information and is considered fulfilling the role of the earlier-mentioned first position sensory system. A compass 307 and an odometer 309 provide redundant, or second position information in support of a second, or dead-reckoning position sensory system. There are many published techniques for building a dead-reckoning sensory system. A simple approach will be detailed here.

A present position dead-reckoning position vector can be determined from an initial position vector and from subsequent distance increments, provided by the odometer 309, and the corresponding new heading values, provided by the compass 307. The initial position vector consists of a pair of initial position coordinates (e.g. a latitude such as 87° N and a longitude 44° W) and a corresponding heading value (e.g. 34° NW). The initial position coordinates are defined by determining the initial location of the vehicle as an intersection of two crossing streets represented on the optical disk containing the road map located in the map database apparatus 303. The map represents such an intersection as a pair of latitude-longitude values which makes up the pair of initial position coordinates. The heading value is provided by the compass 307. Optionally, this dead-reckoning position vector may be used to provide an initial reference position vector. Also, either the GPS position vector, or a position vector determined from a map database referenced by road intersection position coordinates and an associated road segment heading, may be used to provide an initial reference position vector.

A first new position vector, proximate the initial position vector, is derived by adding the distance traversed by the vehicle, in the direction of the above initial heading, over a predetermined period of time. This time may conveniently increment at the synchronous reference positions 263/263'–275/275' shown in FIG. 2. The odometer 309 is mounted on non-powered wheels of the vehicle and its output is coupled to the computer 301. In particular, the computer's MC68332 microcontroller has a facility for counting the pulses provided by the odometer 309. This facility is in the form of a TPU, or Timer Processing Unit, which has various counter timer functions built into hardware and controlled by software. The odometer 309 outputs pulses as the vehicle's wheels rotate. The number of pulses provided over the predetermined period of time indicate the distance traversed by the vehicle. By adding this traversed distance to the initial position along the heading of the initial position vector, the first new position vector is derived. The heading value of the first new position vector is determined by a new compass reading and is determined at the same time that the odometer pulse count was determined and translated into traversed distance. This new position vector would be determined at the synchronous reference positions 263/263'–275/275' shown in FIG. 2. The first new position vector is then substituted for the initial position vector, and the process starts over. By repeating this process, a sequence of position vectors can be determined that describe a path of the traversing vehicle.

While the vehicle is traversing, the above-described path of dead-reckoning position vectors may not reflect the true vehicle path accurately because to various errors in the sensory readings. In this case and if an another, independent source of position vector sequence is available, the dead-reckoning path of position vectors can be continuously adjusted to improve its accuracy. Such adjustment would reflect the belief that the other, independent source of position vectors has been manifesting a more credible behavior at the time when the need for the adjustment is decided. One simple technique for accomplishing this is as follows.

If five consecutive, dead-reckoning position vectors exhibit a behavior that is significantly less consistent than five other position vectors from a more credible positioning source, such as a GPS and/or road segment associated with a map reference, an average error for the five dead-reckoning position coordinates is calculated. The average error is calculated as the Root-Mean-Square of the difference between the coordinate values of the dead-reckoning positions and the corresponding, more credible, positions provided by the GPS and/or road segments associated with a map reference. Then, anticipating that this average error in the dead-reckoning coordinates will not significantly change in the next, sixth, cycle these coordinate error values are used for calculating the next adjusted position coordinates by subtracting the coordinate error values from the ordinarily calculated dead-reckoning position coordinates. The result is a second present estimated position vector. This second present estimated position vector is applied by the improved method as a more precise output of position from the dead-reckoning system. The improved method makes the provision of this second present estimated position vector because it provides a stable, credible, highly confident, reference—in this case the GPS and/or road segments associated with a map reference. Other correction techniques using this credible reference will be detailed below.

The second present estimated position vectors were introduced above as the series of circular icons including 241, 247, and beyond to represent successive position vectors provided by the dead-reckoning position system.

The improved method described below will provide more accurate information regarding the vehicle's present position useful in a route guidance system for more accurately providing guidance instructions, and cueing of same, to a driver. Also, the improved method will provide more accurate information regarding the vehicle's present position that can benefit a tracking type of guidance system that is not strictly reliant on a map reference. Next, the improved method will be introduced.

FIG. 4 is a software flow chart illustrating method steps in accordance with the present invention. The essence of these method steps is to recognize a matching behavior between a sensory system and a map reference over time, or distance, traversed to build confidence in the sensory data. If a pattern of confidence emerges, then the sensory data can be used to influence a fused, or estimated present position vector or reference position vector. Also, armed with this information, other less accurate sensory systems may be adjusted, or corrected, to reflect the position vector associated with the sensory system held in high confidence. These method steps, or routine 400, are encoded into the program memory as executable code in the native language of the computer 301, in this case the Motorola MC68332. Now, the method steps in routine 400 will be detailed. The routine 400 is invoked at step 401.

In step 403 the method determines present position vectors from the dead-reckoning and GPS position sensory systems. Alternatively, position vectors from additional sensory systems may be included in this and future steps. To keep the explanation simple only two position sensory systems are described in this example.

Next, in step 405 all present position vectors are tested against a road segment position vector to see if they match. A match may be determined by one or more of several criteria including position proximity, heading proximity, or other metrics. Preferably, a match is awarded to all present position vectors that correspond to the road segment position vector within a predetermined position boundary and heading angle. The road segment position vector corresponds to a road segment location determined by a reference position vector. If all present position vectors match the road segment position vector within the predetermined position boundary and heading angle, then no correction is necessary and step 4 13 is executed.

In step 413 a new reference position vector is determined. This is accomplished by updating the reference position vector with the increment associated with the road segment position vector. Alternatively, a more general fusion technique can be used as described below in step 419. After this updating step 413 the routine 400 is iterated starting at step 403. If one or more of the present position vectors do not match the road segment position vector within the predetermined position boundary and heading angle criteria, then step 407 is executed.

In step 407, the routine 400 determines whether or not one or more of the sensory position vectors match the road segment position vector within the predetermined position boundary and angle. If none do, then no correction is performed, and step 419 is executed. In step 419 a new reference position vector is determined by updating the reference position vector with the averaged increment of all participating position vectors and the road segment vector. The following equation provides a method for accomplishing this.

$$RPV = RPV^{-1} + \frac{\sum_{j}^{n} \Delta SPVj + \Delta RSV}{n+1} \quad \text{EQUATION 1}$$

where:
RPV=reference position vector
RSV=road segment vector
SPV=sensory position vector
j=jth sensory position vector
n=number of sensory position vectors This equation shows a solution for two or more competing sensory systems. Since in this case only two are described "n" is equal to two. After the new reference position vector is determined the routine 400 is iterated starting at step 403. If one or more of the sensory position vectors match the road segment position vector then step 409 is executed. It's interesting to note here, before proceeding, that the matching sensory systems may be ranked in step 407. In other words, the sensory system with a closer match will have a higher rank. This process, along with a future process will enable a final matching decision to be made effectively. This ranking process would only apply if there were three or more competing positional sensory systems. This is because when there are only two competing sensory system, as in the present example, and they match, as determined above in step 405, step 407 would not be executed.

Next, the matching behavior of the sensory systems position vectors is put to the test of consistency over time, or distance traversed, to build confidence in the data. In step 409, the routine determines whether or not the individual sensory position vectors match the previous road segment position vectors for a predetermined number of previous match cycles. In other words, is the GPS position vector behaving like the map for a long enough time? Again, a simple approach of testing the position vectors to see if they remain within the position boundary and heading angle criteria may be used here. Alternatively, statistical tests of variance, or standard deviation, between successive position vectors may also be used. Or, a heuristic method may be applied to recognize a consistent trend of behavior over time. If the sensory position vector(s) do not match previous road segment position vector(s), then no correction is performed and step 421 is executed. In step 421 a new reference position vector is determined as described above except that ΔSPVj values may be excluded or de-emphasized for sensors that did not match with the road segment in step 407. Then the routine 400 is iterated starting at step 403. If the sensory position vector(s) match previous road segment position vector(s), then step 411 is executed.

In step 411 the sensory system(s) having non-matching sensory position vectors are excluded from further consideration.

Next, in step 415 a winning sensory system and its associated winning position vector is selected. The criteria for this selection may include the aforementioned ranking discussed above in step 409.

Then, in step 417, the reference position vector is updated influenced by the winning position vector. In a route guidance type system it may be preferred to adjust the reference position vector to the map reference. In a tracking type system it may be preferred to adjust the reference position vector to either the winning position vector or a weighted average of the winning position vector and other position vectors that exhibit behavior consistent with the winning position vector's behavior. Optionally, other position sensory systems having non-matching sensory position vectors may be influenced, or corrected by the winning position vector.

Returning to FIG. 2 several actual iterations of the method 400 will be detailed based on actual data from the position sensory systems. To start, a vehicle is assumed to be positioned at the reference position vector 205. At a position, demarked by reference numbers 263 and 263', the routine 400 is iterated. This iteration may be caused by a specific distance traversed, or in the alternative, by a system timer implemented in a timer facility located in the TPU section of the MC68332 microcontroller.

At step 403, a first position vector 207 is provided by the aforementioned GPS positioning portion of the system 300. Also, a second, or redundant, dead-reckoning position vector 203 is provided by the dead-reckoning portion of the system 300. Note that the position vectors are likely determined by the respective positioning systems at different times as illustrated by the respective positions in FIG. 2. When step 403 executes some extrapolation of position vectors may be necessary depending on the positional relationship between the execution of step 403 as demarked by reference numbers 263 and 263', and the actual position that the respective position vectors are generated. As mentioned earlier, other position vectors would be determined here, if other position vectors were available from other positioning systems.

At step 405 the sensory based position vectors 203 and 207 are checked to see if they match a road segment position vector that corresponds to a road segment location determined by the provided reference position vector 205. In the preferred embodiment, a simple position boundary and heading range is used to determine an instantaneous match. The boundary is ±25 meters as described above, and a heading range is +10°. To determine a match, the method step 405 indexes the road map located in the map database apparatus 303 using the reference position vector 205. This index operation determines proximity by comparing the position aspect of the reference position vector to map database road distance and the heading aspect of the reference position vector to map database road heading values. The result is a road segment 281 delimited by road segment endpoint locations indicated by the star icons 209 and 223.

Also, the road map provides a heading 218 for the road segment 281. This road segment 281 is considered, by the indexed map database, to be located most proximate the reference position vector. Next, the road segment position vector is derived from the provided end point positions 209 and 223 and the reference position vector 205. Essentially, the position portion of the reference position vector 205 is projected, perpendicularly 210 intersecting the road segment 218. The position demarked by the oval icon at the intersection 212, becomes the road segment position that defines a positional centroid for the matching test.

Now, the matching test is made. A pair of coordinates provided by the first position vector 207 are compared to a window delimited by the road segment position vector 212 and the reference position boundaries 259 and 261. As seen graphically, a match is made because the first position vector 207 is positioned proximate the road segment position vector 212 and within the reference position boundaries 259 and 261. Next, a heading portion 216 of the first position vector 207 is compared to the predetermined heading range of ±10° surrounding a road segment position vector's heading 218. As seen graphically, the heading portion 216 of the first position vector 207 is contained within the predetermined heading range of ±10° surrounding the heading 218 provided by the road segment position vector 212.

Next, the matching test considers the second position vector 203 provided from the dead-reckoning portion of the system 300. A pair of position coordinates provided by the second position vector 203 are compared to the window delimited by the road segment position vector 212 and the reference position boundaries 259 and 261. As seen graphically, a match is made because the second position vector 203 is positioned proximate the road segment position vector 212 and within the reference position boundaries 259 and 261. Next, a heading portion 214 of the second position vector 203 is compared to the predetermined heading range of ±10° surrounding a road segment position vector's heading 218. As seen graphically, the heading portion 214 of the second position vector 203 is contained within the predetermined heading range of ±10° surrounding the heading 218 provided by the road segment position vector 212.

In the above example a simple positional and angular matching criteria was described to qualify a match for both the dead-reckoning position vector 203, and the GPS position vector 207. Since various positioning systems' behavior has been substantially characterized in the field other behaviors may also be considered for qualifying a match.

For instance, as mentioned above, a heuristic method may be used to predict behavioral matching. This is desirable because of the wide range and continuum of behaviors and factors considered acceptable for each of the many types of sensory systems. These factors may include road density and vehicle speed. For example, a high road density may require a stricter match criteria, and a very high vehicle speed my adopt a low weight for matching when traversing on an unpaved road.

Returning to step 405 in FIG. 4, since all position vectors matched the road segment position vector, no map-matching or sensory system correction is necessary and the routine 400 will be iterated starting at step 403 at a position demarked by reference numbers 265 and 265'.

Next, at the position demarked by reference numbers 265 and 265', step 403 is repeated and the position vectors 211 and 215 are determined. The reference position vector 213 is determined in step 413 by fusing the positional vectors 203 and 207 and continuously adding distance traversed from the dead-reckoning system as described above. The result of this type of fusing is shown in FIG. 2 Various techniques, including more sophisticated and accurate methods, are described in the known art. The road segment position vector 287 is determined as described above for the previous road segment position vector 212. Then, step 405 is executed and both position vectors 211 and 215 are determined to match as before.

Then, at the position demarked by reference numbers 267 and 267', step 403 is repeated and the position vectors 217 and 221 are determined. The reference position vector 219 is determined as described above. Notice here that as the dead-reckoning position vector veers Northwest, the reference position vector 219 follows it. This is due to the fusing technique described above. The road segment position vector 289 is determined as described above for the previous road segment position vector 287. Then, step 405 is executed and both position vectors 211 and 215 are determined to match as before.

Next, at the position demarked by reference numbers 269 and 269', step 403 is repeated and the position vectors 225 and 229 are determined. The reference position vector 227 is determined as described above. Next, in step 405, since the vehicle is located outside of the bounded positions delimited by the road segment end point locations indicated by the star icons 209 and 223, a new road segment must be extracted from the road map located in the map database apparatus 303. This new road segment 283 is located using the present reference position vector 227. The map database provides the road segment endpoint locations 223 and 237, and a heading corresponding to the heading of the road segment 283. The road segment position vector 291 is determined as described above for the previous road segment position vector 289. Then, step 405 is executed and both position vectors 225 and 229 are determined to match as before. Note here that the second position vector 225 is closely proximate one of the reference position boundaries, in this case 259.

Then, at the position demarked by reference numbers 271 and 271', step 403 is repeated and the position vectors 231 and 235 are determined. The reference position vector 233 is determined as described above. Notice here that the dead-reckoning position vector veers outside of the reference position boundary 259. This is significant because the dead-reckoning positioning system will no longer qualify as being matched. The road segment position vector 293 is determined as described above for the previous road segment position vector 291. Then, step 405 is executed and the GPS position vector 235 is determined to match as before. However, the dead-reckoning position vector 231 has exceeded the positional boundary criteria. Because of this, step 407 is executed.

In step 407, the routine 400 determines whether or not one or more of the sensory position vectors match the road segment position vector within the predetermined position boundary and angle. Since one of the position vectors 235 matches both the positional and heading criteria, step 409 is executed.

Next, In step 409, the GPS position vector is tested to see if it has consistently matched with the previous road segment position vectors for a predetermined number of previous match cycles. In other words, the trend of the GPS position vectors is compared to the trend of road segment position vectors estimated to be on the road. If the trends match for a long enough time then a map-match is executed. The time, or distance traversed used to qualify the quality of the match is shown by reference number 257, which extends along the road proximate reference number pairs 265, 265' and 273, 273'. Since, in this case the trend of the GPS position vectors 215, 221, 229, and 235 has not matched the road segment position vectors 287, 289, 291, and 293 long enough, as shown by reference number 257 a match has not been attained. Note that in this example the routine 400 executes starting before the position demarked by reference number 257. However, the positions demarked by reference number 257 are not shown to commence at reference number 263 for clarity of illustration purposes only. The routine 400 then iterates at step 403. Next, at the position demarked by reference numbers 273 and 273', steps 403 through 409 are repeated. Note that the dead-reckoning position vector is disqualified because it exceeds the boundary criteria associated with reference number 259. The result of step 409 is that the trend of the GPS position vectors 215, 221, 229, 235, and 246 has matched the road segment position vectors 287, 289, 291, 293, and 295 for long enough, as shown by reference number 257. Therefore, a match has been attained and step 411 is executed. Because only the GPS position vectors are considered matching there are none to exclude. Then, step 415 is executed. Because only the GPS sensory system is competing in this test it wins. This is where two or more matching sensors will be reduced to a singular sensor based on the aforementioned ranking.

Next, in step 417 the reference position vector, previously 233, is updated to another position vector which can be one of the three shown 239, 243, or 246. At this point several possibilities are desirable based on the use of the system. For instance, in a route guidance system it is most desirable to update, or snap, the reference position vector to the position located on the nearest road segment. This may be the road segment position vector. The reason for this snapping strategy is because in this type of system inevitably the driver intends to drive on the roads associated with the map database. This improves the accuracy of the reference position vector with respect to influencing accurate route guidance instruction cueing. This snapped position is shown by the rectangle located at reference number 239.

Alternatively, the snap-to position may be chosen as an average position vector 243 located between the road segment location and the first (GPS) position vector 245. This may be desirable in a tracking system where accuracy of position is more important than considering whether or not the vehicle is positioned on a road.

Also, if the GPS, or other winning sensor is considered significantly more accurate than the map database, then the snap-to position vector 246 may correspond to the first (GPS or other) position vector 245.

Further, if desirable, other (non-matching) position sensory systems can be corrected, or snapped, influenced by the winning position vector. As mentioned earlier, the second present estimated position vector, output from the dead-reckoning system may be adjusted influenced by the winning GPS position vector. This adjustment is shown at reference number 241. In this case the selected snap-to position is located between the known road and the GPS position vector 246.

A final iteration is shown at synchronous reference positions reference numbers 275/275' and position vectors 247, 249, 251, 253, 255, 285, 297, and 298. A reference position vector 255 is the result of the a snap-to position of 246 at reference numbers 273 and 273'. A dead-reckoning position vector 247 is the result of the a snap-to position of 241 at reference numbers 273 and 273'.

It is interesting to note here that the dead-reckoning position sensory system has been in-effect disqualified. This enables the improved method to either disregard or to de-emphasize the disqualified dead-reckoning position sensory system from influencing the reference position vector until it becomes qualified.

Although the preferred embodiment details a case with a GPS receiver based positioning system and a dead-reckoning based positioning system, those skilled in the an will certainly recognize that it would be a simple matter to substitute a different positioning system for either or both of these and still benefit from the described method and system. Additionally, those skilled in the art will also recognize that it would be a simple matter to extend this method and system to account for more than two competing sensors as mentioned above.

In summary, an improved method, and corresponding system, for map-matching has been presented that overcomes the accuracy limitations of prior an approaches. The method considers a trend of position vectors generated by a Global Positioning System, and trend of position vectors provided by a competing dead-reckoning system. These position vectors are compared to a map reference. An estimated, or reference position vector is updated based on a matching of each trend to the map reference. This update, or correction, can take several forms as described above. Of course, each of the abovementioned correction techniques can be used alone or in combination depending on the designers preference.

This approach is more accurate than conventional systems when it will not be made inaccurate by forcing the reference position vector to a position based on the fused positions of several sensors. Further, it is less computationally intensive than prior an systems because it doesn't rely on using stochastic methods for generating a reference position vector.

Although the method and system described in the preferred embodiment applies to a vehicle, other platforms, such as a portable guidance device could take advantage of the improved method and system without departing from the improved teachings.

What is claimed is:

1. A method of map-matching for determining position vectors associated with road segments on a map, the method comprising the steps of:

determining a first position vector from a first sensory system;

determining at least a second position vector from at least a second sensory system; and comparing the first position vector and the at least second position vector to a road segment position vector corresponding to a road segment location determined by a reference position vector, and updating the reference position vector to correspond to a corrected position vector if at least one of the first position vector and the at least second position vector matches the road segment position vector within a predetermined criteria for a plurality of comparisons.

2. A method in accordance with claim 1 wherein said reference position vector is initially determined by utilizing at least one of the first position vector, the second position vector, and a position vector determined from a map database referenced by road intersection position coordinates and an associated road segment heading.

3. A method in accordance with claim 2 wherein said predetermined criteria comprises a position boundary.

4. A method in accordance with claim 3 wherein said corrected position vector is a vector corresponding to a location and heading on a road segment most proximate the first position vector.

5. A method in accordance with claim 3 further comprising a step of:

measuring a distance traversed; and wherein said plurality of comparisons is associated with the distance traversed.

6. A method in accordance with claim 3 wherein said corrected position vector is different than said road segment position vector.

7. A method in accordance with claim 6 wherein said corrected position vector corresponds to the first position vector.

8. A method in accordance with claim 3 further comprising a step of:

measuring a distance traversed; and wherein said step of determining at least a second position vector from at least a second sensory system comprises a step of determining at least a second present estimated position vector different than the at least second position vector, and wherein the at least second present estimated position vector is updated to an alternative position vector if the first position vector matches the road segment position vector within a predetermined boundary for the distance traversed.

9. A method in accordance with claim 8 wherein the alternative position vector corresponds to said road segment position vector.

10. A method in accordance with claim 8 wherein the alternative position vector corresponds to a position different than said road segment position vector.

11. A method in accordance with claim 10 wherein the alternative position vector corresponds to said first position vector.

12. A method in accordance with claim 1 wherein said predetermined criteria comprises a variance.

13. A system of position estimation for determining position vectors associated with road segments on a map using competitive sensory position map-matching comprising:

first sensory means for providing a first position vector;

at least a second sensory means for providing at least a second position vector; and means for comparing the first position vector and the at least second position vector to a road segment position vector corresponding to a road segment location determined by a reference position vector, and updating the reference position vector to correspond to a corrected position vector if at least one of the first position vector and the at least second position vector matches the road segment position vector within a predetermined criteria for a plurality of comparisons.

14. A system in accordance with claim 13 wherein said reference position vector is initially determined by utilizing at least one of the first position vector, the second position vector, and a position vector determined from a map database referenced by road intersection position coordinates and an associated road segment heading.

15. A system in accordance with claim 13 wherein said predetermined criteria comprises a position boundary.

16. A system in accordance with claim 15 wherein said means for updating the reference position vector to correspond to a corrected position vector updates the reference position vector to a vector corresponding to a location and heading on a road segment most proximate the first position vector.

17. A system in accordance with claim 15 further comprising a step of:

means for measuring a distance traversed; and wherein said plurality of comparisons is associated with the distance traversed.

18. A system in accordance with claim 15 wherein said corrected position vector is different than said road segment position vector.

19. A system in accordance with claim 15 further comprising a step of:

means for measuring a distance traversed; and wherein said at least a second position vector provided by the at least a second sensory system comprises means for determining at least a second present estimated position vector different than the at least second position vector, and wherein the at least second present estimated position vector is updated to an alternative position vector if the first position vector matches the road segment position vector within a predetermined boundary for the distance traversed.

20. A system in accordance with claim 19 wherein the alternative position vector corresponds to said road segment position vector.

21. A system in accordance with claim 19 wherein the alternative position vector corresponds to a position different than said road segment position vector.

22. A system in accordance with claim 21 wherein the alternative position vector corresponds to said first position vector.

23. A system in accordance with claim 13 wherein said predetermined criteria comprises a variance.

24. A system in accordance with claim 13 whereto said corrected position vector corresponds to the first position vector.

25. A method of map-matching comprising the steps of:

providing a map comprising road segments;

providing a reference position vector indicative of a vehicle's position associated with the provided map;

determining a road segment position vector corresponding to a road segment located on the map dependent on the provided reference position vector;

determining a first position vector from a first sensory system;

determining a second position vector from a second sensory system; and replacing the reference position vector with a new reference position vector dependent on the position vector of the first and second position vectors that matches the road segment position vector within a predetermined criteria for a plurality of comparisons.

* * * * *